Aug. 23, 1938.   H. HANFT   2,128,088
JOINT FOR THE CONNECTION OF SHAFTS
Filed March 16, 1937   5 Sheets-Sheet 1

INVENTOR:
HANS HANFT
BY Haseltine Lake & Co.
ATTORNEYS

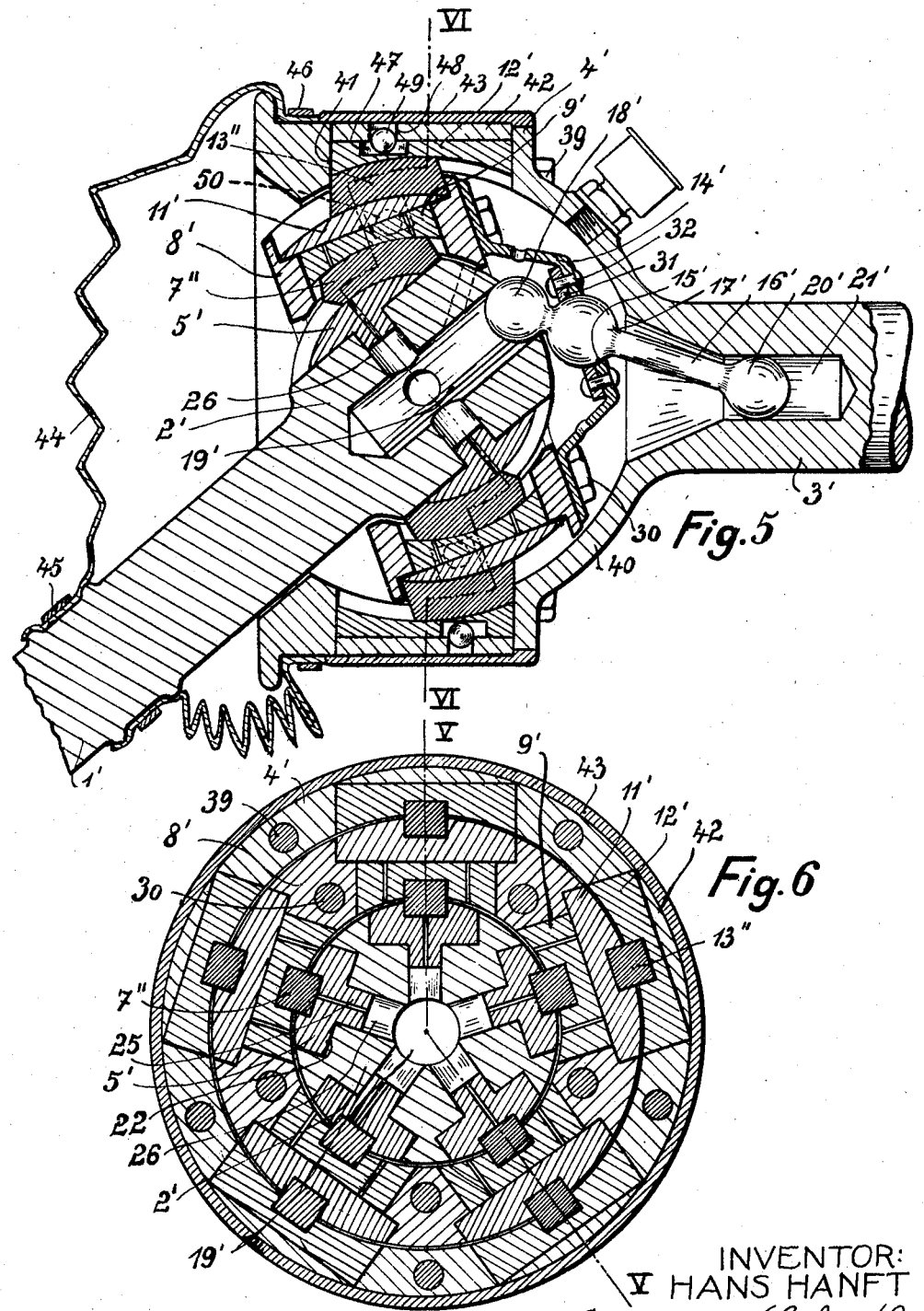

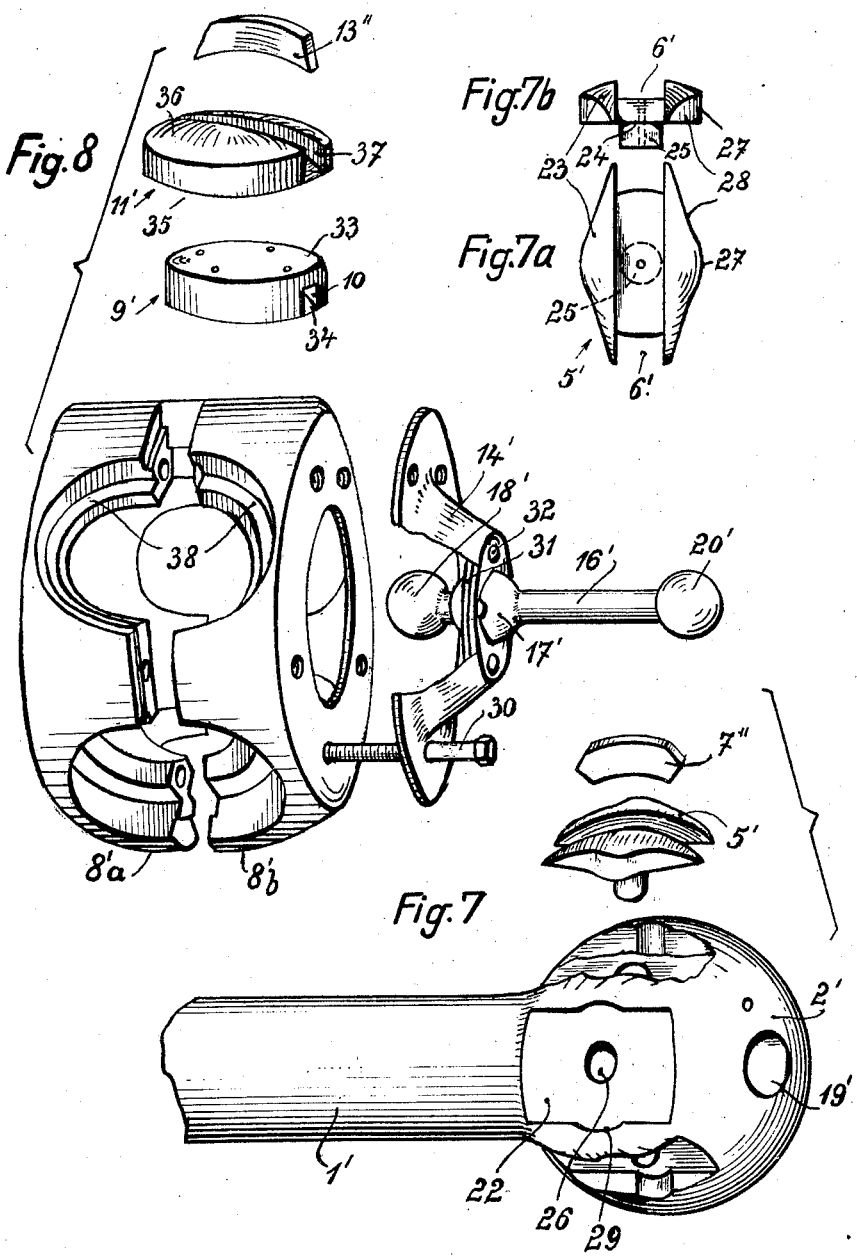

Aug. 23, 1938.  H. HANFT  2,128,088
JOINT FOR THE CONNECTION OF SHAFTS
Filed March 16, 1937  5 Sheets-Sheet 5
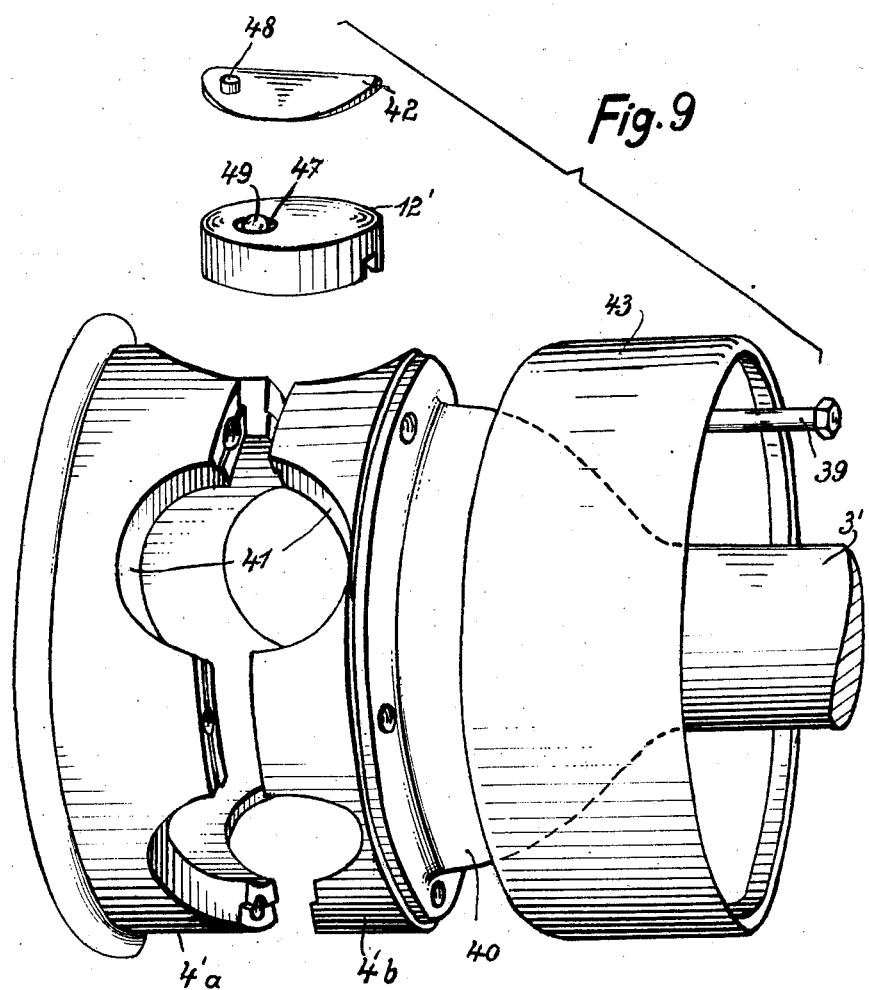
INVENTOR:
HANS HANFT
BY Haseltine, Lake & Co.
ATTORNEYS Patented Aug. 23, 1938

2,128,088

UNITED STATES PATENT OFFICE 2,128,088

JOINT FOR THE CONNECTION OF SHAFTS

Hans Hanft, Munich, Germany

Application March 16, 1937, Serial No. 131,172
In Germany August 19, 1936

10 Claims. (Cl. 64—21)

The invention relates to a joint for the connection of shafts or shaft parts, for example in automotive vehicles, which may also be used to particular advantage for driving the steerable wheels of automobiles.

A joint is known in which a spherical joint head connected to one shaft and a bowl-shaped joint socket connected to the other shaft are coupled together by the aid of an intermediate ring interposed between the head and socket, the head being connected with the intermediate ring, and the latter connected with the socket, by means of driving members guided in channels or grooves formed in insets which are rotatably mounted both in the head, the intermediate ring and the socket. In such a joint it may occur that when the two coupled shafts have been relatively swivelled in a certain direction and are then returned in the opposite direction, the intermediate ring, which may take part in such swivelling movement, especially in the case of extensive displacement, remains in a position in which it may produce disadvantageous clamping effects.

The object of this invention is to provide means in a joint of the aforesaid kind, whereby such clamping effect of the intermediate ring is prevented.

According to the invention I provide a guide member for the intermediate ring which is at both ends in movable engagement with the ends of the two shafts and which is held between its ends for universal rotary movement in the intermediate ring, the centre point for the universal rotary movement of the guide member being situated in equal distance from the centre point of the joint system at any angular position of the two shafts. Thereby the guide member positively rocks the intermediate ring in such manner that the two shafts may with safety be angularly displaced or swivelled through wide angles without any clamping effect. Swivelling movements through angles of as great as 40°–45° may be ensured by this arrangement.

In a preferred embodiment of the invention the guide member positively rocking or moving the intermediate ring during the swivelling movement of the shafts comprises a rod having spherical ends, which ends are adapted to rotate and slide in axial borings or recesses in the ends of the two shafts, while between the ends of the rod a spherical collar is arranged, which is held in rotatable, but not slidable engagement in a bowl-shaped or spherical bearing provided in the intermediate ring.

A joint is already known in which the joint head and the joint socket are coupled, without the assistance of an intermediate ring, by driving members (balls) guided in meridian grooves in the head and socket. In such joint, a cage is provided between the joint head and the joint socket which is intended always to hold the driving members in a mean angular position with respect to the angular position of the shafts. The cage is, in this case, positively controlled by a lever, the two ends of which are spherical, one being arranged in a boring in one of the shafts against a resilient supporting bearing, while the other spherical end engages in a correspondingly shaped seat in the other shaft and is forced into the seat by the said resilient supporting bearing. A spherical part provided between the two ends of the lever is displaceably guided in a cylindrical, axial aperture in the cage. Such joint has in practice the drawback that the lever controlling the cage may become clamped even when the shafts are displaced or swivelled through relatively small angles, so that further moving of the shafts is prevented.

In the case of the joint according to the present invention, the guide rod which positively adjusts the position of the intermediate ring is so mounted that upon moving the shafts out of axial alignment, the centre point of the spherical collar on the guide rod always remains at the same distance from the centre of the joint system, while the two spherical ends of the rod are able to move axially of their respective borings, the spherical end of the rod in the joint head being removed from the centre point of the system, and the spherical end of the rod in the other shaft approaching the centre point of the system. In this way, while all clamping effects are avoided, the shafts may be swivelled in any planes through angles of from 40°–45° on either side of the aligned position.

Some constructional forms of joint according to the invention are illustrated by way of example in the accompanying drawings.

Figure 5 represents in section on the line V—V of Figure 6, a modified constructional form of joint according to the invention, the shafts being in a position similar to that of Figure 2.

Figure 6 shows a cross section on the line VI—VI of Figure 5.

Figure 7 is a dissected perspective view of the joint head and certain associated parts.

Figure 7a is a plan view and

Figure 1:
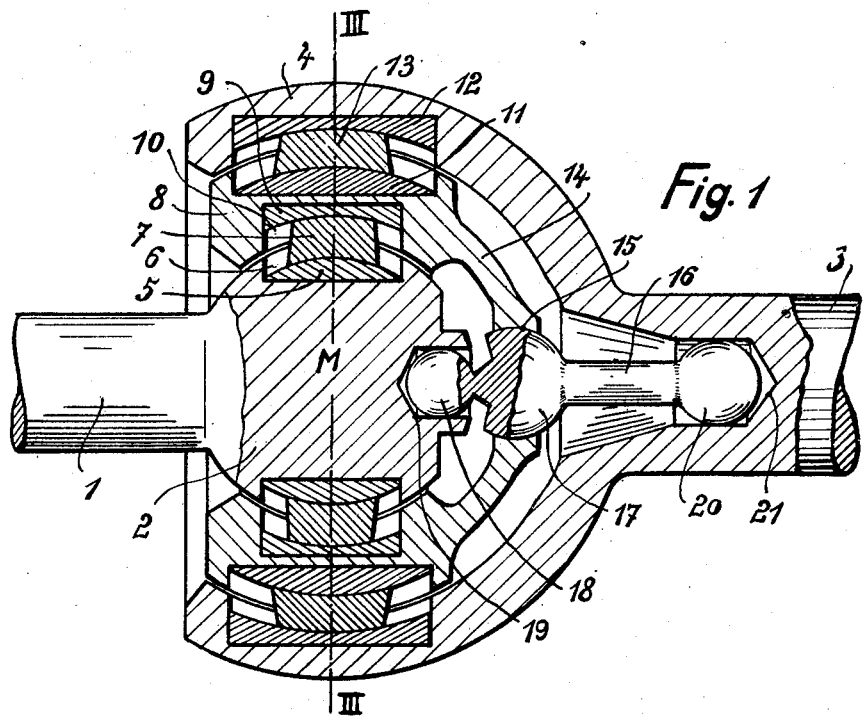
Figure 1 is a diagrammatic longitudinal section on the line I—I of Figure 3 through a joint having driving members in the form of slide-blocks, the two shafts being shown in axially aligned position.

Figure 7b an end elevation of a special form of inset movably mounted in the joint head.

Figure 8 is a dissected perspective view of the intermediate ring and certain associated parts.

Figure 9 is a dissected perspective view of parts associated with the joint socket.

In the constructional form according to the Figures 1–4, one shaft 1 is formed with a spherical joint head 2 and the other shaft 3 with a spherical socket 4. In the head 2 (see Figure 3) are uniformly distributed five insets 5, which are adapted to rotate in their bearings and have a spherical outer surface corresponding to that of the joint head 2. Each rotatable inset 5 has on its outer side a channel or groove 6 with straight lateral walls and a cylindrical convex base, in which a slide-block 7 is guided having cylindrically curved base and top faces and flat side faces. With the joint head 2 co-operates an intermediate ring 8, which has a concave inner surface and a convex outer surface and completely surrounds the joint head, the curvature of the inner surface corresponding to that of the surface of the joint head. The inner face of the intermediate ring 8 co-operating with the surface of the head 2 is provided, opposite the insets 5, and in corresponding recesses to those in the head, with similar rotatable inner insets 9 formed with guide grooves 10 having straight lateral walls and a cylindrical concave base, so that the driving slide-blocks 7 are guided partly within the insets 5 of the joint head 2 and partly within the corresponding insets 9 of the intermediate ring 8.

Figure 3:
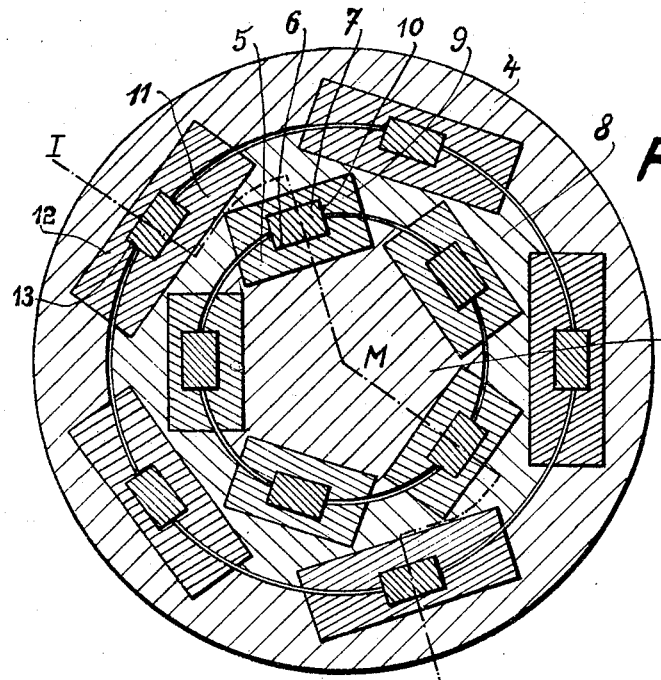
Figure 3 is a cross section on the lines III—III and III'—III', respectively, of Figures 1 and 2.

The intermediate ring 8 is further provided on its outer side with rotatable insets 11, which are radially staggered with relation to the inner insets 9 (see Figure 3). Rotatable insets 12 arranged in the inner face of the joint socket 4 opposite the insets 11 co-operate through slide-blocks 13 with these outer insets.

If the joint head 2 or the joint socket 4 be moved in any direction, some of the slide-blocks 7 and 13 slide in their grooves towards one end and some towards the opposite end of the respective groove. Others are displaced to a smaller extent, while the corresponding insets rotate. The remainder of the slide-blocks are not displaced at all, and the insets with which these slide-blocks engage rotate about their own axis, so that the slide-blocks merely take part in this rotational movement.

The intermediate ring 8 is provided at one side with a cap-shaped extension or cover 14, which is provided with a spherical bearing 15 in which a spherical collar 17 on a guide rod 16 is mounted, so that the rod 16 is held for universal rotary movement about the centre point of the collar 17, but is not axially slidable. The rod 16 at its ends is in movable engagement with the shafts 1 and 3. The end 18 of the rod, which is of spherical form, is both rotatably and slidably mounted in a boring 19 in the head 2, and the other end 20, which is also of spherical form, is rotatably and slidably mounted in a boring 21 in the shaft 3.

Figure 2:
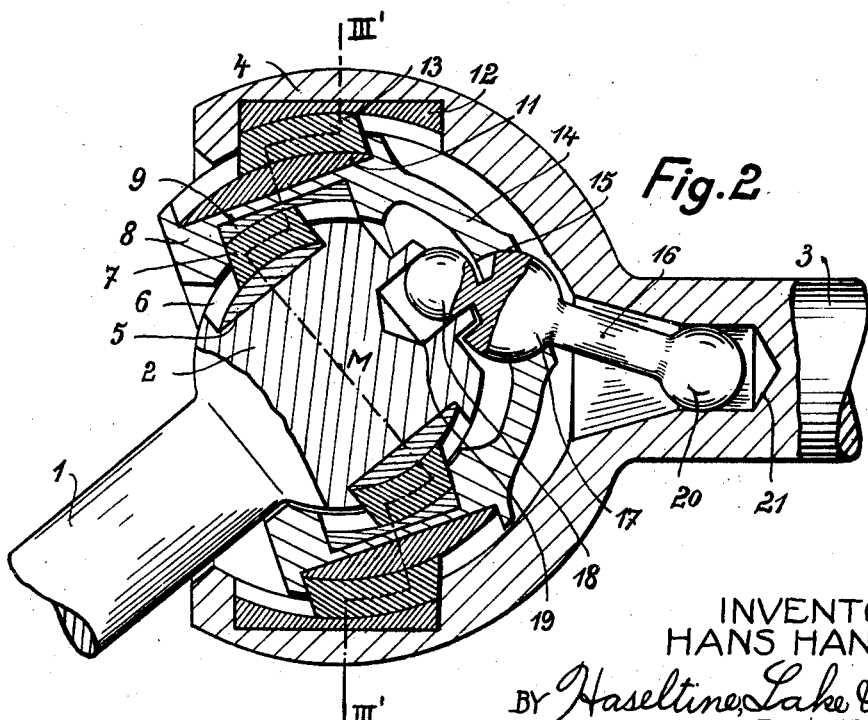
Figure 2 is a similar longitudinal section, in which, however, the two shafts are shown angularly displaced with respect to one another.

When the two shafts are angularly displaced with respect to one another, that is to say, when the shaft 1 is e. g. moved from the aligned position illustrated in Figure 1 into the angular position illustrated in Figure 2, the intermediate ring 8 is positively rocked by the guide rod 16 without any clamping effect through an angle which is less than that of the displacement angle of the shafts. As will be seen, the rod 16 is so mounted that the centre point of its spherical collar 17 always remains at the same distance from the centre point M of the joint system at any angular displacement of the shafts, while the spherical ends 18 and 20 of the rod may rotate and slide in their borings 19 and 21 through the entire angular movement of the shafts.

The distances of the centre points of the balls 17, 18 and 20 from each other and from the centre point M of the entire joint system with the shafts in aligned position, may be so selected that in operation of the joint the intermediate ring is rocked through about one half of the angle between the shafts, and the centre point of the ball 17 travels over an imaginary spherical surface which passes approximately centrally between the outer and inner surfaces of the intermediate ring.

Instead of slide blocks, rotation bodies, such as rollers, and also balls may be used as the driving members, which, if desired, may be retained in special cages.

Figure 4:
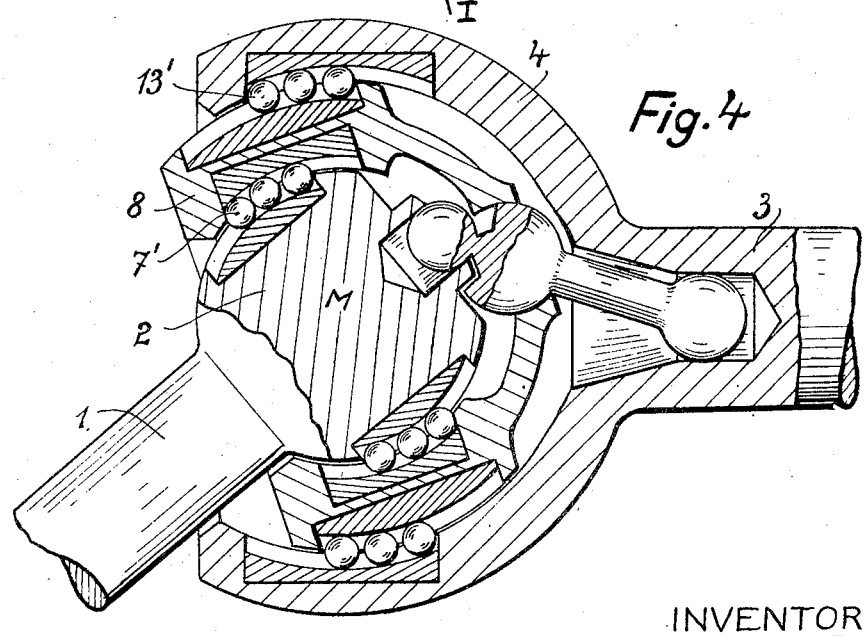
Figure 4 is a longitudinal view through a joint similar to that of Figure 2, but in which balls are used as driving members.

Figure 4 illustrates a constructional form of joint provided with sets of driving balls instead of slide-blocks. Between the joint head 2 and the intermediate ring 8, the force is transmitted by the balls 7' and between the ring 8 and the joint socket 4 by the balls 13'. The balls 7' and 13' arranged in two layers one above the other are, similar to the slide-blocks 7 and 13 in the constructional form according to Figures 1 to 3, guided in the rotatable insets in correspondingly shaped grooves, the number of balls in each rotatable inset being dependent on the size of the joint, and in the example illustrated three balls are arranged in each pair of insets.

Figures 5–9 illustrate a modified construction of joint and show additional features and the construction of the individual parts.

The substantially spherical joint head 2' on the shaft 1' has five elongated recesses 22 extending axially of the shaft, and in each recess is mounted a rotatable inset 5' of special form. As will be seen, in particular from Figures 7, 7a and 7b these insets have a spherical upper surface 23 corresponding to the spherical surface of the joint head, and a flat lower surface 24 from which extends a pivot pin 25 able to be received within an aperture 26 in the joint head 2', extending radially from the centre of the recess 22 in the direction of the centre of the joint head. Each inset 5' is formed in its upper surface with a longitudinal channel or groove 6' having a cylindrically curved, convex base and even lateral walls, in which channel a slide-block 7'' of square cross-section and cylindrically curved base and top faces is slidable.

The insets 5' are, seen from above (Figure 7a), of approximately rhombic shape and of different longitudinal and transverse dimensions, while the mid-portions 27 of the lateral surfaces 28 are sections of a circular cylinder, the diameter of which being somewhat greater than the width of the recess 22 in the joint head. The side walls of the recesses 22 in the joint head are formed with correspondingly cylindrically curved cavities 29 within which the curved midportions 27 of the insets 5' engage, so that the insets, pivotal about their pins 25, may also be laterally guided at these points.

A central boring 19' provided in the joint head 2', and serving mainly to receive one spherical end 18' of the guide rod 16', forms at the same time a channel for feeding the lubricant to the inner parts of the joint, as will be seen from Figures 5 and 6.

About the joint head 2' is arranged the intermediate ring 8', which, in order that it may be fitted over the joint head, consists of two parts 8'a and 8'b (see Figure 8) secured together by means of bolts 30, the division plane running preferably transversely to the axis of the intermediate ring. The bolts 30 serve at the same time to secure to the intermediate ring a cup-shaped extension or cover 14' which is provided with a spherical bearing 15' for the spherical collar 17' of the guide rod 16' (see Figure 5). In order that the collar 17' may be inserted within said bearing 15', the latter is formed partly in the cover 14' and partly in a plate 31 which is secured by the aid of rivets 32 or other means to the cover. In this arrangement, the spherical ends 18' and 20' of the guide rod 16', which are guided in the cylindrical borings 19' and 21' of the joint head 2' and of the shaft 3', are of smaller diameter than the spherical collar 17', in order that they may be passed through the apertures in the cover 14' and the plate 31.

The intermediate ring 8' is provided with inner rotatable insets 9', which co-operate with the insets 5' in the joint head 2', and outer rotatable insets 11'. The inner and outer insets 9' and 11' as seen from above, are of circular form. The inner insets 9' (see Figure 8) have a flat upper surface 33 and a concave spherical lower surface 34, in which a guide groove 10', having a cylindrically curved, concave base and straight lateral walls for receiving the upper half part of the driving slide-block 7", is provided. The outer insets 11' have a flat lower surface 35 and a convex spherical upper surface 36, in which a guide groove 37, having a cylindrically curved, convex base and straight lateral walls, is provided.

In the case of the constructional example of the joint illustrated in Figures 5 to 9, the outer insets 11' of the intermediate ring are not staggered in relation to the inner insets 9', as is the case in Figure 3, but they are arranged radially outwardly of the inner insets (see Figure 6), so that the assembly is facilitated without the desired manner of operation of the joint being in any way impaired. The intermediate ring may be, therefore, formed with continuous, cylindrical stepped apertures 38 (see Figure 8) having an internal diameter corresponding to that of the inner insets 9' and a greater external diameter corresponding to that of the outer insets 11'. In assembling the intermediate ring parts 8'a and 8'b over the joint head associated with its insets 5', the slide-blocks 7" are first inserted through the apertures 38, which slide-blocks effect the transmission between the joint head 2' and the intermediate ring 8'. These slide-blocks 7", by reason of the special construction of the rotatable insets 5' in the joint head, may be made longer than in the case of the constructional form shown in Figures 1-3 (in which all insets are circular in plan), the surface area of the slide-blocks which comes into question for transmission between the joint head and the intermediate ring being thus advantageously increased. Then the inner insets 9' and finally the outer insets 11' are fitted in the apertures 38 of the two parts of the intermediate ring united by means of the bolts 30.

Around the intermediate ring is arranged the joint socket consisting of the annular parts 4'a and 4'b which are secured together by bolts 39 and provide a flat outer surface and a concave spherical inner surface, which latter surface corresponds to the convex spherical outer surface of the intermediate ring 8', the part 4'b of the joint socket being connected to the second shaft 3' in one piece through the cap-shaped part 40 (see Figure 9).

In the joint socket 4' are situated the rotatable insets 12', which are of similar form to the inner insets 9' of the intermediate ring and co-operate by means of correspondingly shaped slide-blocks 13'' with the outer insets 11' of the intermediate ring. The insets 12' in the joint socket 4' are fitted in cylindrical apertures 41 in the joint socket, and the remaining space above them is closed by metal bodies 42, the outer surface of each body 42 corresponding to the cylindrical outer surface of the joint socket parts 4'a and 4'b. The parts 4'a and 4'b of the joint socket are surrounded exteriorly by a ring 43. To facilitate the centering during assembly, the two parts 4'a and 4'b of the joint socket and the two parts 8'a and 8'b of the intermediate ring are stepped at their abutting edges, so that they overlap.

As in the joint according to the invention the driving shaft always rotates entirely in unison with the driven shaft, the packing of the open side of the joint may take place in an extremely simple and secure manner. A packing cap 44 (see Figure 5), which may consist in the usual manner of a rubber or leather material, may be rigidly secured by its edges both to one shaft and to the other, for example by means of clips 45, 46 or the like. It is also possible to use, instead of the flexible packing cap 44 shown in Figure 5, two rigid spherical metal caps, one of which has a central aperture with a flange, by means of which it is securely connected by a clip or the like to one shaft, while the other cap has a central aperture with a flange, by means of which it is securely connected by a clip or the like to the other shaft or the socket connected thereto. Upon swivelling the shafts, the two caps engaging with each other would then be moved relative to one another. Alternatively the open end of the first-mentioned cap could slip directly on the joint socket, which in this case would have a spherical outer surface, as is assumed in Figures 1–4.

The rotatability of the insets 12' in the joint socket 4' may be limited, for example by providing in these insets 12' a cylindrical aperture 47 and, in the joint socket, i. e. in the bodies 42 an aperture 48 of smaller diameter, aligned with the first-mentioned aperture 47, and arranging in the apertures a ball 49, the diameter of which corresponding to that of the smaller aperture 48. The balls 49 thus lie partially in the insets 12' and partially in the bodies 42, so that, as said bodies constituting part of the joint socket are immovable with respect to the joint socket 4', the insets 12' can only rotate about their axis as far as is permitted by the balls 49, at a predetermined angle of rotation of the insets 12', the balls striking against the lateral walls of the larger apertures 47 in the insets 12', and thereby preventing any further rotation of said insets. In this way it is possible, for example, to prevent turning of the insets into an undesired position when the joint is not in operation. Similarly, rotatability of the inner and outer insets 9' and 11' in the intermediate ring, may also be limited, for example, by balls 50 located in aligned apertures of equal size in adjacent inner and outer insets 9' and 11', the diameter of the ball 50 being smaller than that of the co-acting apertures receiving it.

The feed of lubricant into the interior of the joint may take place through the joint socket or the packing cap or, in the case of hollow shafts, through the shafts themselves. An advantage resides in that satisfactory packing of the joint, preventing the escape of lubricant and the entrance of dust or the like, is attained by reason of the fact that the packing cap may be securely connected to the two shafts, because the shafts rotate in a completely uniform manner.

It is to be noted that the slide-blocks 7" between the joint head and the intermediate ring, and the slide-blocks 13" between the intermediate ring and the joint socket, should have a certain length. For example, the inner slide-blocks 7" should be so long in their central longitudinal section that their ends in any position of the shafts always extend beyond a plane passing through the centre point of the joint system and the centres of the insets 5' in the joint head. In the same way, the outer slide-blocks 13" in their central longitudinal section should be of such length that their ends extend beyond a plane passing through the centre point of the system and the centres of the insets 11' in the intermediate ring. The same applies to the case that sets of balls are used instead of slide-blocks, in which case the centre point of the outermost ball in one inset would have to lie beyond the corresponding plane.

The number of rotatable insets depends on the size of the joint and on the power to be transmitted; five (as assumed in the drawings) or seven in each row is found to be a particularly advantageous number.

I claim:

1. A joint for the connection of shafts, in particular in automotive vehicles, comprising a joint head on one shaft and a joint socket on the other shaft, an intermediate ring interposed between said head and socket bearing means for said ring, a plurality of insets rotatably mounted in the co-operating faces of said head, socket and ring, driving members movably located within said insets, a guide member adapted to positively rock said intermediate ring and being at both ends in movable engagement with the ends of said two shafts and being held between said ends for universal rotary movement in said bearing means of the intermediate ring, the centre point for the universal rotary movement of said guide member being situated in equal distance from the centre point of the joint system at any angular position of said two shafts.

2. A joint for the connection of shafts, in particular in automotive vehicles, comprising a joint head on one shaft and a joint socket on the other shaft, an intermediate ring interposed between said head and socket bearing means for said ring, a plurality of insets rotatably mounted in the co-operating faces of said head, socket and ring, driving members movably located within said insets, a guide rod for moving said intermediate ring, the ends of said guide rod being movable in axial borings in the ends of said two shafts, and a spherical face provided on said guide rod between its ends and being in rotatable but not slidable engagement with said intermediate ring.

3. A joint for the connection of shafts, in particular in automotive vehicles, comprising a spherical joint head on one shaft and a spherical joint socket on the other shaft, an intermediate ring fitted between said head and socket bearing means for said ring, a plurality of insets rotatably mounted in the co-operating faces of said head, socket and ring, driving members movably located within said insets, means for limiting the range of rotation of said insets, a guide rod for moving said intermediate ring, said guide rod being provided with spherical end portions adapted to rotate and slide in axial borings in the ends of said two shafts, and a spherical collar provided on said guide rod between its spherical end portions and being in rotatable but not slidable engagement in a spherical bearing provided in said intermediate ring.

4. A joint for the connection of shafts, in particular in automotive vehicles, comprising a spherical joint head on one shaft and a spherical joint socket on the other shaft, an intermediate ring fitted between said head and socket bearing means for said ring, a plurality of insets rotatably mounted in the co-operating faces of said head, socket and ring, driving means movably located in said insets and establishing cooperative movement between co-acting insets, means for limiting the range of movement between said insets, a guide rod for moving said intermediate ring, said guide rod being provided with spherical end portions adapted to rotate and slide in axial borings in the ends of said two shafts, and a spherical collar provided on said guide rod between its spherical end portions, and a spherical bearing formed upon said intermediate ring in which said spherical collar is held for universal rotary movement.

5. A joint for the connection of shafts, in particular in automotive vehicles, comprising a spherical joint head on one shaft and a spherical joint socket on the other shaft, an intermediate ring fitted between said head and socket, a plurality of insets rotatably mounted in the co-operating faces of said head, socket and ring, slide-blocks guided in channels in opposing insets, a guide rod for moving said intermediate ring, said guide rod being provided with spherical ends adapted to rotate and slide in axial borings in the ends of said two shafts, and a spherical collar provided on said guide rod between its spherical ends, a cover on one side of said intermediate ring and a plate removably secured to said cover, said cover and plate being apertured to form a spherical bearing in which said spherical collar is held for universal rotary movement, said spherical bearing and collar being so positioned with respect to the centre point of the joint system that in operation of the joint the centre point of said spherical collar travels over an imaginary spherical surface passing approximately centrally between the inner and outer faces of said intermediate ring.

6. A joint for the connection of shafts, in particular in automotive vehicles, comprising a spherical joint head on one shaft and an annular joint socket connected to the other shaft, an intermediate ring interposed between said head and socket, a plurality of insets rotatably mounted in the co-operating faces of said head, socket and ring, driving members movably located within said insets, said intermediate ring and annular joint socket being each divided into two parts along planes running transversely to their axes, said parts being stepped at their abutting edges and secured together, and a guide rod for moving said intermediate ring, the ends of said guide rod being movable in axial borings in the ends of said two shafts, and a spherical face provided on said guide rod and being in rotatable but not slidable engagement with said intermediate ring.

7. A joint for the connection of shafts, in particular in automotive vehicles, comprising a spherical joint head on one shaft and an annular joint socket connected to the other shaft, an intermediate ring fitted between said head and socket, a plurality of insets rotatably mounted in the co-operating faces of said head, socket and ring, driving members movably located within co-acting insets, said intermediate ring and annular joint socket being each divided into two parts along planes running transversely to their axes, said parts being stepped at their abutting edges and secured together, a guide rod which is provided with spherical ends adapted to rotate and slide in axial borings in the ends of said two shafts and with a spherical collar intermediate said spherical ends, a cover removably bolted to one side of said intermediate ring, and a plate removably secured to said cover and plate being apertured to form a spherical bearing for said spherical collar, the spherical bearing and collar being so positioned with respect to the centre point of the joint system that in operation of the joint the centre point of said spherical collar travels over an imaginary spherical surface passing approximately centrally between the inner and outer faces of said intermediate ring.

8. A joint for the connection of shafts, in particular in automotive vehicles, comprising a joint head on one shaft and a joint socket on the other shaft, an intermediate ring fitted between said head and socket, a plurality of insets rotatably mounted in the co-operating faces of said head, socket and ring, the insets of the joint head being located in recesses provided in said joint head, and extending normally axially of the shaft connected to said head, means for operatively connecting said insets to said head, said insets being adapted to engage with correspondingly shaped cavities in the side walls of said recesses, driving members movably located within co-acting insets of said joint head, joint socket and intermediate ring, a guide rod having spherical ends engaging in axial borings in the ends of said two shafts and having an intermediate spherical collar in a spherical bearing in said intermediate ring.

9. A joint for the connection of shafts, in particular in automotive vehicles, comprising a joint head on one shaft and a joint socket on the other shaft, an intermediate ring fitted between said head and socket, a plurality of insets rotatably mounted in the co-operating faces of said head, socket and ring, an aperture in each of the circular insets in said joint socket, apertures of smaller diameter in the joint socket, the last-mentioned apertures being aligned with said first-mentioned apertures, and a ball located within each pair of said apertures in said socket and socket insets the diameter of the ball corresponding to that of the smaller apertures, driving members movably located within co-acting pairs of the several series of insets, a guide rod having spherical ends engaging in axial borings in the ends of said two shafts and having a spherical collar seated in a spherical bearing in said intermediate ring.

10. A joint for the connection of shafts, in particular in automotive vehicles, comprising a joint head on one shaft and a joint socket on the other shaft, an intermediate ring fitted between said head and socket bearing means for said ring, a plurality of insets rotatably mounted in the co-operating faces of said head, socket and ring, ball driving means located in said insets establishing cooperative movement between co-acting insets, means for limiting the range of movement of said insets, a guide rod having spherical ends engaging in axial borings in the ends of said two shafts and having a spherical collar seated in a spherical bearing in said intermediate ring and being rotatable but not slidable therein.

HANS HANFT.